US009590915B2

(12) United States Patent
Cai et al.

(10) Patent No.: US 9,590,915 B2
(45) Date of Patent: Mar. 7, 2017

(54) TRANSMISSION OF MAP/REDUCE DATA IN A DATA CENTER

(75) Inventors: Bin Cai, Beijing (CN); Li Li, Beijing (CN); Zhe Xiang, Beijing (CN); Wei Xue, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 13/638,409

(22) PCT Filed: Mar. 14, 2011

(86) PCT No.: PCT/EP2011/053809
§ 371 (c)(1),
(2), (4) Date: May 23, 2013

(87) PCT Pub. No.: WO2011/120791
PCT Pub. Date: Oct. 6, 2011

(65) Prior Publication Data
US 2013/0332612 A1 Dec. 12, 2013

(30) Foreign Application Priority Data
Mar. 31, 2010 (CN) .......................... 2010 1 0138992

(51) Int. Cl.
*H04L 12/911* (2013.01)
*G06F 17/30* (2006.01)
(Continued)

(52) U.S. Cl.
CPC ............ *H04L 47/70* (2013.01); *G06F 9/5066* (2013.01); *H04L 67/1097* (2013.01); *G06F 17/30445* (2013.01)

(58) Field of Classification Search
CPC ..... G06F 9/5066; G11C 16/349; H04L 47/70; H04L 67/1097
(Continued)

(56) References Cited

U.S. PATENT DOCUMENTS 5,946,685 A * 8/1999 Cramer et al.
7,590,620 B1 9/2009 Pike et al.
(Continued)

OTHER PUBLICATIONS

O'Reilly, Release 2.0, Feb. 2009, O'Reily Media, Inc., Issue 11, ISSN 1935-9446.*
(Continued)

*Primary Examiner* — David Lazaro
*Assistant Examiner* — Zi Ye
(74) *Attorney, Agent, or Firm* — Scully, Scott, Murphy & Presser, P.C.; David M. Quinn

(57) ABSTRACT

A method for transmission of map/reduce data in a data center having a storage network (SAN), the data center including multiple servers deployed with a job tracker, map task trackers and reduce task trackers, the method comprising: in response to receiving a map task allocated by the job tracker, a map task tracker performing the map task and generating map task outputs; the map task tracker writing the map task outputs to the storage network; and in response to receiving a reduce task allocated by the job tracker, a reduce task tracker reading the map tasks outputs from the storage network.

8 Claims, 7 Drawing Sheets

(51) Int. Cl.
  *G06F 9/50* (2006.01)
  *G06F 15/173* (2006.01)
  *H04L 29/08* (2006.01)
(58) Field of Classification Search
  USPC .......................... 709/226; 712/203; 711/103
  See application file for complete search history.

(56) References Cited

U.S. PATENT DOCUMENTS

| | | | |
|---|---|---|---|
| 7,640,390 B2* | 12/2009 | Iwamura et al. | 711/103 |
| 7,650,331 B1* | 1/2010 | Dean et al. | 712/203 |
| 2008/0086442 A1 | 4/2008 | Dasdan et al. | |
| 2008/0183777 A1* | 7/2008 | Xi | G06F 17/30067 |
| 2008/0281993 A1 | 11/2008 | Nicholson et al. | |
| 2009/0276771 A1 | 11/2009 | Nickolov et al. | |

OTHER PUBLICATIONS

Preston, The Top 10 SANs vs. NAS Decision Factors, Mar. 14, 2002 http://www.onlamp.com/pub/a/onlamp/2002/03/14/sansnas.html.*

Dean et al., "MapReduce: Simplified Data Processing on Large Clusters", In: Proceedings of Operating Systems Design and Implementation (OSDI), 2004, S. 137-149; URL: http://static.usenix.org/event/osdi04/tech/full_papers/dean/dean.pdf [abgerufen am Mar. 29, 2013].

Shafer et al., "Datacenter Storgage Architecture for MapReduce Applications", In: Workshop on Architectural Concerns in Large Datacenters (ACLD), 2009, S. 1-3; URL: http://www.jeffshafer.com/publications/papers/shafer_acid09.pdf/view [abgerufen am Mar. 29, 2013].

German Office Action, 11 2011 101 109.1, mailed Apr. 8, 2013.

Jin et al., "MapReduce Programming Model for .NET-Based Cloud Computing", Aug. 25, 2009, Euro-Par 2009 Parallel Processing, Springer Berlin Heidelberg, Berlin, Heidelberg, pp. 417-428, XP19127251, ISBN: 978-3-642-03868-6.

Yang et al., "Map-reduce-merge: simplified relational data processing on large clusters", Proceedings of the 2007 ACM SIGMOD International Conference on Management of Data, Jun. 12-14, 2007, pp. 1029-1040, XP002637043, Beijing, China, DOI: http://doi.acm.org/101145/1247480.124760, ISBN: 978-1-59593-686-8.

Chen et al., "Efficiently support MapReduce-like computation models inside parallel DBMS", Proceedings of the 2009 International Database Engineering & Applications Symposium, Series = Ideas '09, Sep. 16-18, 2009, pp. 43-53, XP002637042, Cetraro-Calabria, Italy, DOI: http://doi.acm.org/10.1145/1620432.1620438, ISBN: 978-01-60558-402-7.

Xie et al., "Improving MapReduce performance through data placement in heterogeneous Hadoop clusters", Parallel & Distributed Processing, Workshops and PHD Forum (IPDPSW), 2010, IEEE, International Symposium on, IEEE, Piscataway, NJ, USA, Apr. 19, 2010 pp. 1-9, XP001680250, ISSBN: 978-1-4244-6533-0.

Anonymous, "Using Lustre with Apache Hadoop", Sep. 2010, XP002637044, Retrieved from the Internet: URL:http://wiki.lustre.org/images/1/lb/Hadoop_wp_v04.2.pdf, retreived on May 13, 2011.

Shafer et al., "Datacenter Storage Architecture for MapReduce Applications", Workshop on Architecture Concerns in Large Datacenters, 2009.

International Search Report and Written Opinion, PCT/EP2011/053809.

* cited by examiner ns filtered, provided that each mapping is independent of the other, all maps can be performed in parallel—though in practice it is
TRANSMISSION OF MAP/REDUCE DATA IN A DATA CENTER

TECHNICAL FIELD

The invention relates to a method and system for map/reduce data transmission in a data center having a storage network.

BACKGROUND

MapReduce is software framework proposed by Google for parallel computing on large data sets (greater than 1 TB). The concepts of "Map" and "Reduce" as well as the main ideas thereof are borrowed from functional programming languages. Current MapReduce middleware implementations require application developers to specify a Map function to map a set of key-value pairs to some new key-value pairs referred to as intermediate key-value pairs, and also require application developers to specify a Reduce function to further process the intermediate key-value pairs outputted from the Map function. Map invoking partitions the input data into M input data splits automatically, which input data splits can be distributed to multiple machines for parallel processing. Reduce invoking partitions the intermediate keys into R splits (e.g., hash (key) mod R) through a partition function, which splits are also distributed to multiple machines. The number of the partitions R and the partition function may be specified by the user. MapReduce achieves scalability by distributing large-scale operations on data sets to multiple nodes on the network.

Currently, MapReduce is considered an important program design specification for building a data center and already has a very wide range of applications, typically including: distributed grep, distributed sorting, web access log analysis, reverse index construction, document clustering, machine learning, statistics-based machine translation, and so on. In order to fulfil demands on MapReduce processing/generation of large amounts of data, there is a need to build an underlying network architecture applying MapReduce, for example, a new type of data center employing the converged network architecture. However, for a traditional data center, rebuilding an underlying network architecture applying MapReduce will cost a lot of money. FIG. 1 shows a schematic diagram of a network architecture of a traditional data center having a storage network, wherein the network topology of the traditional data center is usually composed of two networks: a local area network (LAN) and a storage network (SAN). SAN is a dedicated high-performance network for transmitting data between various servers and storage resources, avoiding traffic collision problems which usually occur between clients and servers in a traditional message network (such as a TCP/IP network commonly used in LAN). FIG. 2 shows a schematic diagram of MapReduce data transmission in a traditional data center having a storage network according to the prior art. Since the current MapReduce middleware transmits the outputs of a Map task to a Reduce task through the HTTP application layer protocol, there is a need to use the TCP/IP protocol stack, in which case, the outputs of the Map task can only be transmitted to the Reduce task through the low-performance network LAN, resulting in inefficient processing of MapReduce data jobs.

Therefore, there is a need for a method of improving MapReduce data transmission efficiency without changing the hardware architecture of the traditional data center.

SUMMARY

Based on the above problems, the present invention provides a method and system for transmission of map/reduce data in a data center having a storage network as defined by the appended claims.

The method and system according to embodiments of the present invention read the map task outputs from the storage network directly, utilizing the network bandwidth of the storage network sufficiently, and taking full advantage of the performance of the dual-network architecture of the traditional data center, on the precondition of maintaining the hardware architecture of the traditional data center.

BRIEF DESCRIPTION OF THE DRAWINGS

Embodiments of the invention will now be described, by way of example only, with reference to the accompanying drawings in which.

DETAILED DESCRIPTION

Figure 1:
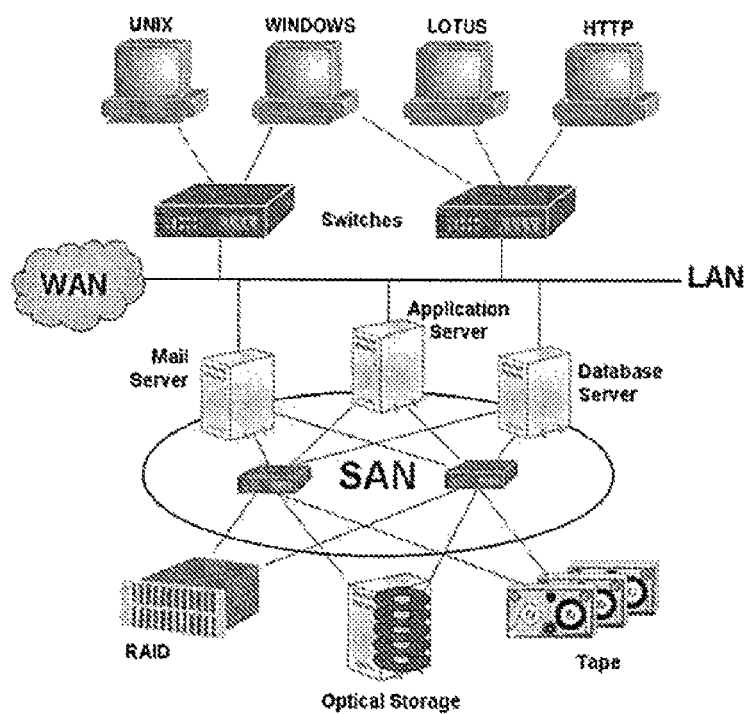
FIG. 1 shows a schematic diagram of the network architecture of a traditional data center having a storage network.

The objects and advantages of the present invention will be better understood from the following detailed description of the method and system for MapReduce data transmission in a data center having a storage network (SAN) taken in conjunction with the drawings according to embodiments of the present invention.

MapReduce is a framework for computing certain kinds of distributable problems using a large number of computers (nodes), collectively referred to as a cluster. Computational processing can occur on data stored either in a file system (unstructured) or within a database (structured).

"Map" step: The master node takes the input, chops it up into smaller sub-problems, and distributes those to worker nodes. A worker node may do this again in turn, leading to a multi-level tree structure.

The worker node processes that smaller problem, and passes the answer back to its master node.

"Reduce" step: The master node then takes the answers to all the sub-problems and combines them in a way to get the output—the answer to the problem it was originally trying to solve.

The advantage of MapReduce is that it allows for distributed processing of the map and reduction operations. Provided each mapping operation is independent of the other, all maps can be performed in parallel—though in practice it is limited by the data source and/or the number of CPUs near that data. Similarly, a set of 'reducers' can perform the reduction phase—all that is required is that all outputs of the map operation which share the same key are presented to the same reducer, at the same time. While this process can often appear inefficient compared to algorithms that are more sequential, MapReduce can be applied to significantly larger datasets than that which "commodity" servers can handle—a large server farm can use MapReduce to sort a petabyte of data in only a few hours. The parallelism also offers some possibility of recovering from partial failure of servers or storage during the operation: if one mapper or reducer fails, the work can be rescheduled—assuming the input data is still available.

It will be understood that while the present embodiment is described in the context of the MapReduce framework defined by Google, the present invention finds general utility in techniques for computing distributable problems using large numbers of computers.

A Job Tracker and multiple Task Trackers are two most basic services of a MapReduce framework, the Job Tracker deployed on a master node to receive jobs submitted by users, unifiedly schedule all the jobs, manage all the Task Trackers, divide each of the jobs submitted by the users into multiple tasks including Map tasks and Reduce tasks, and be responsible for allocating the tasks to the Task Trackers; the tasks are basic units to be executed specifically and needing to be allocated to appropriate Task Trackers for execution; the Task Trackers assigned to execute the Map tasks are Map Task Trackers, the Task Tracker assigned to execute the Reduce tasks are Reduce Task Trackers, and the Task Trackers report the status of the tasks to the Job Tracker while executing them so as to help the Job Tracker to know the job execution as a whole.

Figure 2:
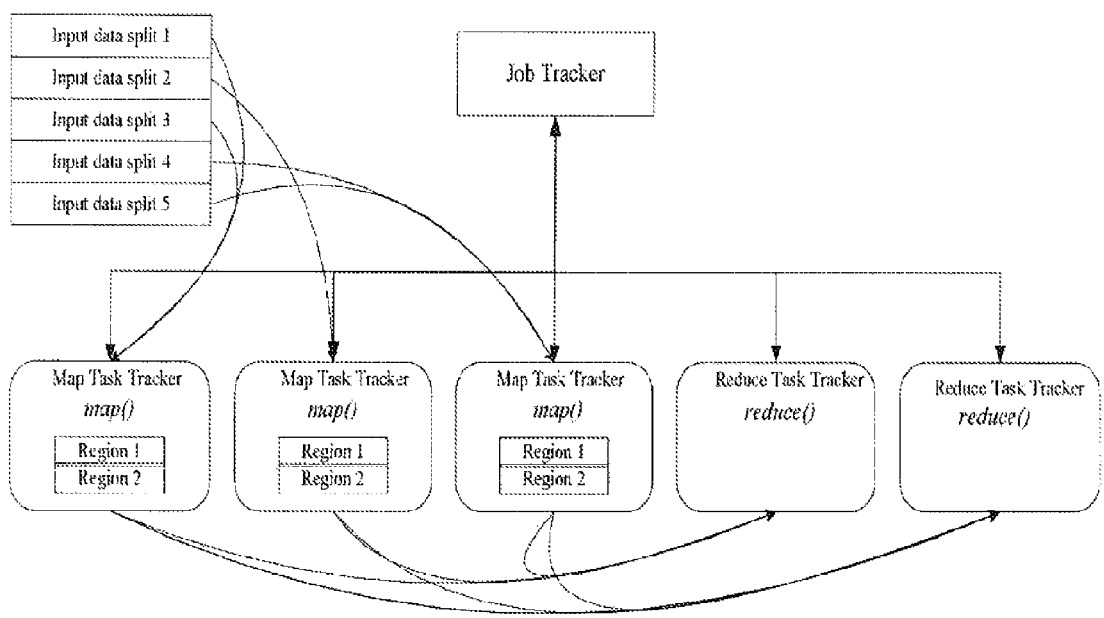
FIG. 2 shows a schematic diagram of MapReduce data transmission in a traditional data center having a storage network according to the prior art.
Figure 3:
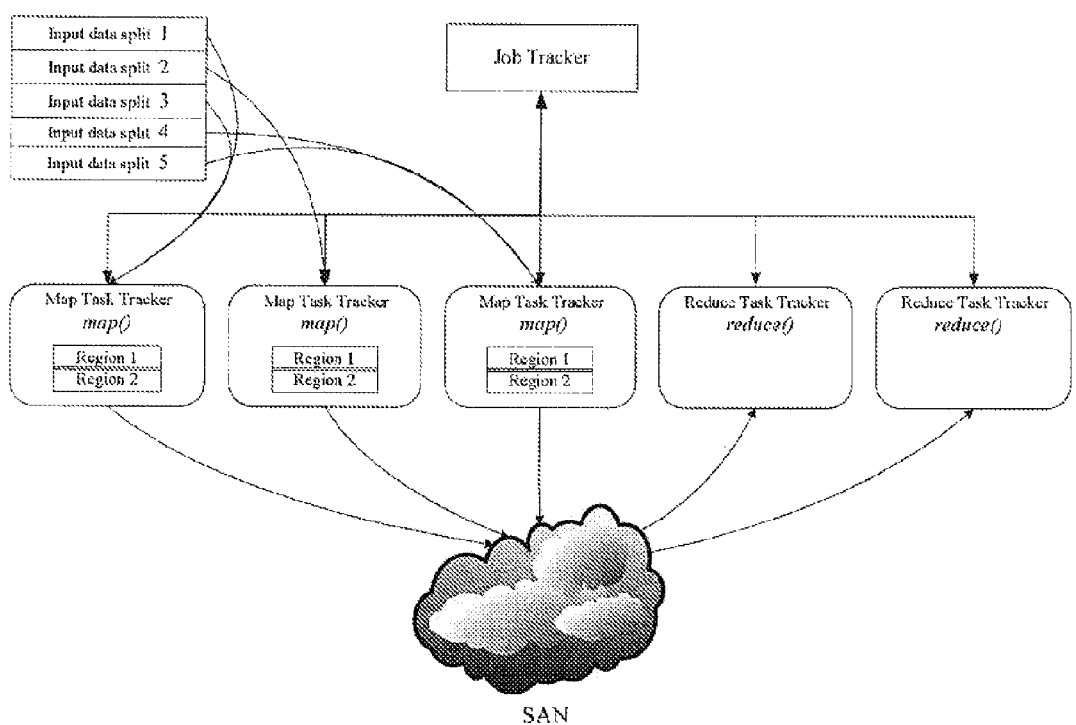
FIG. 3 shows a schematic diagram of MapReduce data transmission in a data center having a storage network according to an embodiment of the present invention.

FIG. 3 shows a schematic diagram of MapReduce data transmission in a data center having a storage network according to an embodiment of the invention. Different from the prior art shown in FIG. 2, the Map task outputs are read by a Reduce Task Tracker from the storage network (SAN) directly instead of being transmitted to the Reduce Task Tracker via a local area network (LAN), taking full advantage of the network bandwidth of the storage network and increasing the efficiency in data transmission.

Figure 4:
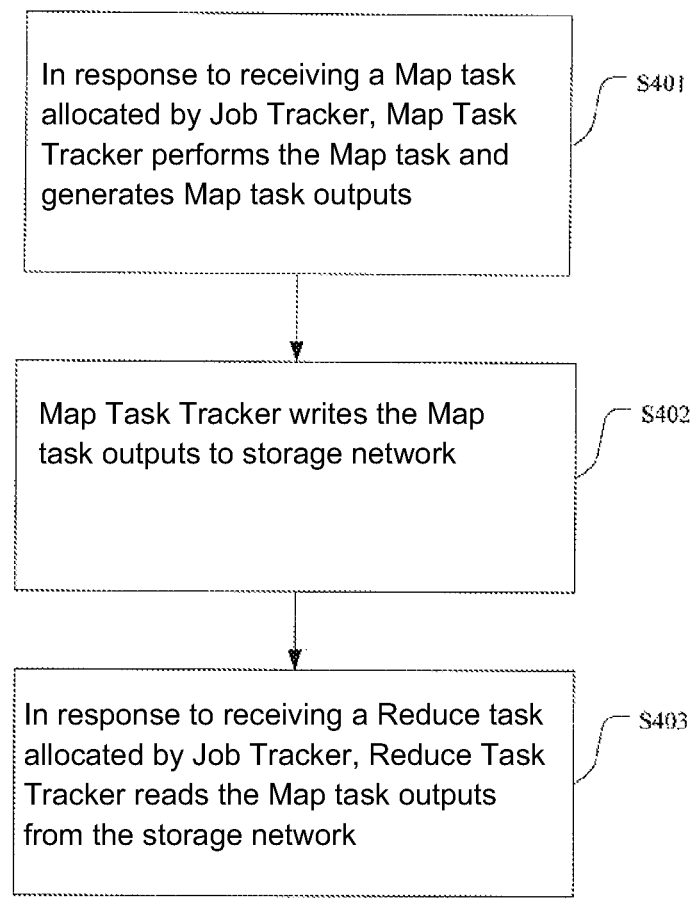
FIG. 4 shows a method of MapReduce data transmission in a data center having a storage network according to an embodiment the present invention.

FIG. 4 shows a method of MapReduce data transmission in a data center having a storage network according to an embodiment of the present invention, the data center including multiple servers deployed with a Job Tracker, a Map Task Tracker and a Reduce Task Tracker, the method comprising: in step S401, in response to receiving a Map task allocated by the Job Tracker, the Map Task Tracker performing the Map task and generating Map task outputs; in step S402, the Map Task Tracker writing the Map task outputs to the storage network; and in step S403, in response to receiving a Reduce task allocated by the Job Tracker, the Reduce Task Tracker reading the Map task outputs from the storage network.

In step S401, a user at a client first uploads an input file to a distributed file system deployed on a cluster of the data center, then submits a job request to the Job Tracker and partitions the input file into M input data splits, the size of each of which is generally from 16 to 64 MB, and thereafter also uploads the program required for executing the job to the distributed file system deployed on the cluster of the data center. On receiving the job request submitted by the client, the Job Tracker divides the job into multiple tasks including M Map tasks and R Reduce tasks, and is responsible for allocating the Map tasks or Reduce tasks to free Task Trackers.

Figure 5:
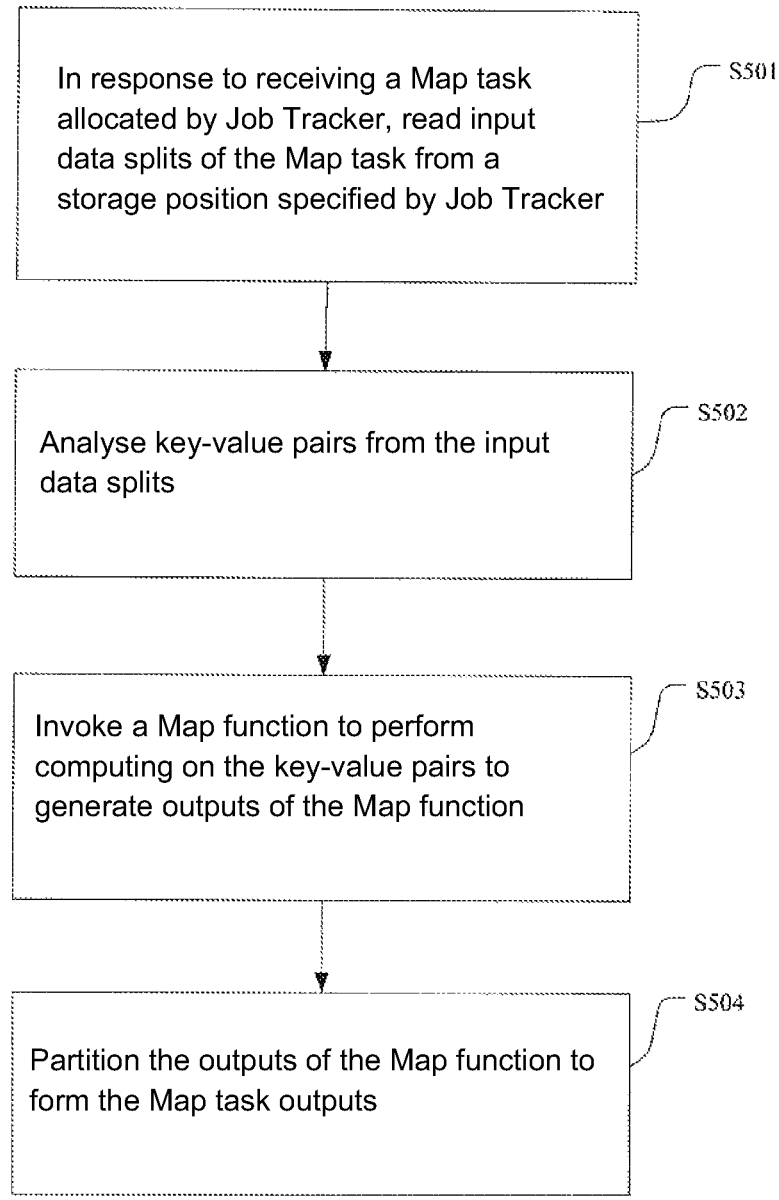
FIG. 5 shows a flow chart of a method of a Map Task Tracker performing a Map task according to an embodiment of the invention.

FIG. 5 shows a flow chart of a method of the Map Task Tracker performing a Map task according to an embodiment of the invention. In response to receiving a Map task allocated by the Job Tracker, the Map Task Tracker performs the following steps:

In step S501, reading input data splits of the Map task from storage position specified by the Job Tracker, which storage position may be a local server deployed with the Map Task Tracker, or another server;

In step S502, analyzing key-value pairs from the input data splits;

In step S503, invoking the Map function to perform computing on the key-value pairs and generate the outputs of the Map function: the key-value pairs are passed to a user-defined Map function Map ( ), and the intermediate key-value pairs generated by the Map ( ) are buffered in the memory; and In step S504, partitioning the outputs of the Map function to form Map task outputs: the intermediate key-value pairs buffered in the memory are periodically written to local disks and the partitioning results of the intermediate key-value pairs, i.e., the Map task outputs, are generated by the partition function partition ( ).

In step S402, the Map Task Tracker writes the Map task outputs to the storage network: the partitioning results generated by the partition function partition ( ) are written to R regions of the local disks; since servers of traditional data centers have no local disks or the capacities of the local disks are small, and the servers use storage space provided by the SAN to store large volumes of data, the intermediate key-value pairs generated by the Map ( ) and the partitioning results of the intermediate key-value pairs, i.e., the Map task outputs, are stored in storage devices of the SAN.

According to an embodiment of the invention, the Map Task Tracker writing the Map task outputs to the storage network further comprises recording the write position information of the Map task outputs, and upon completion of the Map task, sending a notification of completion of the Map task to the Job Tracker and sending the write position information of the Map task outputs to the Job Tracker.

According to one embodiment of the present invention, the Map Task Tracker writes the Map task outputs in the form of data blocks to the storage network through FCP (Fiber Channel Protocol). Specifically, the Map Task Tracker accesses the logical units on storage devices allocated to the Map Task Tracker by the storage network through a FCP device on the local server, and writes the Map task outputs in the form of data blocks to corresponding position of the logical unit. According to this embodiment, the write position information of the Map task outputs may be identified by the combination of fields like storage device identification World-Wide Port Name (WWPN), Logical Unit Number (LUN), start address offset of the data block in the logical unit, data block length, etc. Those skilled in the art can understand that besides the above fields, other extension fields which may be defined based on different ways of writing the data blocks fall within the scope of the present invention.

According to another embodiment of the invention, the Map Task Tracker writes the Map task outputs to the storage network through a storage network file system. Specifically, it is first determined that the storage network file system has been installed on the local server deployed with the Map Task Tracker; then the Map task outputs are written to the storage network file system, and the path name of the Map task outputs in the global name space of the storage network file system is recorded as the write position information of the Map task outputs.

Those skilled in the art can understand that the Map Task Tracker and the Reduce Task Tracker may also pre-determine reading/writing in specific storage space in the SAN, in which case, it is unnecessary to record and transmit the write position information of the Map task outputs.

Figure 6:
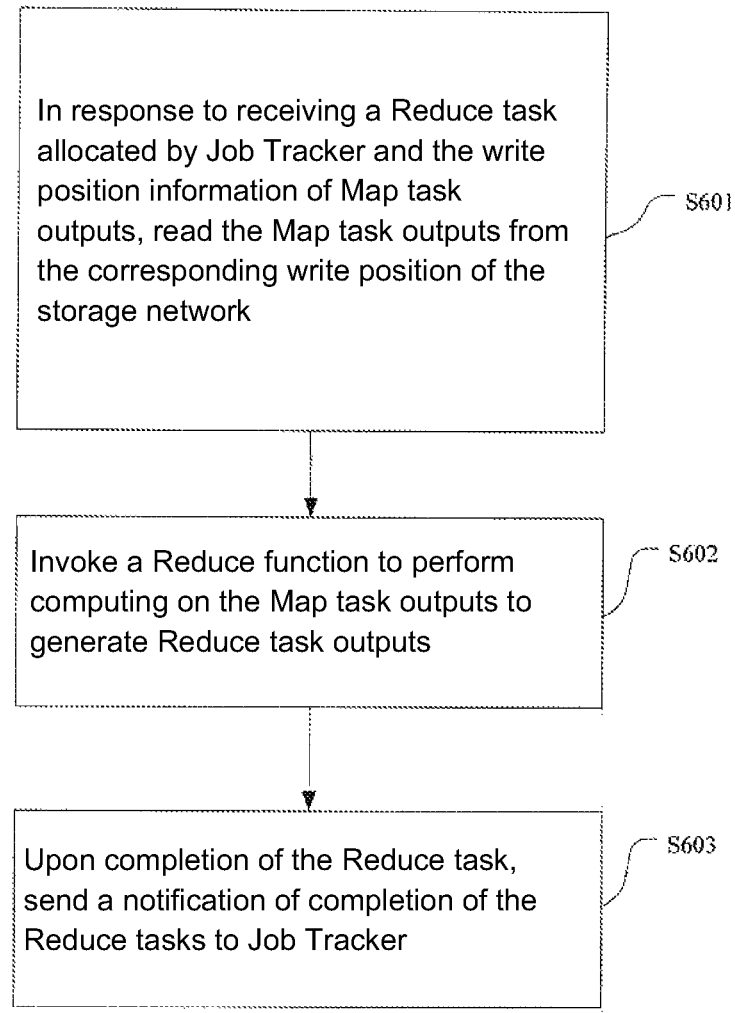
FIG. 6 shows a flow chart of a method of a Reduce Task Tracker performing a Reduce task according to an embodiment of the invention.

FIG. 6 shows a flow chart of a method of the Reduce Task Tracker performing a Reduce task according to an embodiment of the invention, wherein the Reduce Task Tracker performs the following step:

In step S601, in response to receiving a Reduce task allocated by the Job Tracker and the write position information of the Map task outputs, reading the Map task outputs from the corresponding write position of the storage network.

According to one embodiment of the present invention, the Reduce Task Tracker obtains the data blocks of the Map task outputs from the storage network via Fiber Channel Protocol (FCP). Specifically, the Reduce Task Tracker reads the data blocks of the Map task outputs from the corresponding write position of the storage network: first resolving the received write position information of the Map task outputs to obtain fields like WWPN, LUN, start address offset of the data blocks and data block length, and then accessing the logical unit on the storage device identified by the above fields directly through the FCP device on the local server deployed with the Reduce Task Tracker to obtain the data blocks of the Map task outputs. Since this method of data transmission directly uses the lower level protocol FCP of the storage network, the data transmission has the advantages of high throughput and small latency.

According to another embodiment of the invention, the Reduce Task Tracker obtains the Map task outputs through the storage network file system. Specifically, it is first determined that the storage network file system has been installed on the local server deployed with the Reduce Task Tracker; then the Reduce Task Tracker parses the write position information of the Map task outputs from the Job Tracker to obtain the path name of the Map task outputs in the global name space of the storage network file system, and further converts the path name in the global naming space to a path name in the local file system of the local server, and obtains the Map task outputs by accessing the path name of the local file system. This method uses the higher level protocol for data transmission, and has an advantage of low development cost.

In step S602, the Reduce function is invoked to perform computing on the Map task outputs to generate Reduce task outputs, wherein after reading all the intermediate data, the Reduce Task Tracker aggregates the contents with the same key through sorting. Because many different keys are mapped to the same reduce task, sorting is necessary. For each unique intermediate key encountered, it passes the key and an associated set of intermediate values to Reduce function self-defined by application developers, and the outputs of the Reduce function are added to a final output file.

In step S603, upon completion of the Reduce task, a notification of completion of the Reduce task is sent to the Job Tracker. When all the Map and Reduce Tasks are completed, the Job Tracker notifies the user program.

Figure 7:
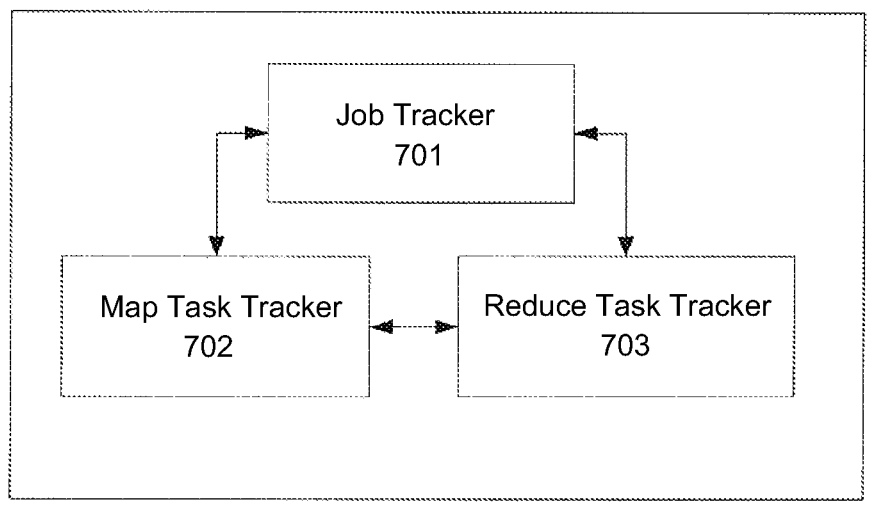
FIG. 7 shows a block diagram of a system of MapReduce data transmission in a data center having a storage network according to an embodiment of the present invention.

Under the same inventive concept, the present invention further proposes a system for MapReduce data transmission in a data center having a storage network (SAN). FIG. 7 shows a system 700 for MapReduce data transmission in a data center having a storage network according to an embodiment of the present invention. The system comprises: a Job Tracker 701 configured to assign a Map Task Tracker to perform a Map task and a Reduce server to perform a Reduce task; the Map Task Tracker 702 configured to, in response to receiving the Map task allocated by the Job Tracker, perform the Map task to generate Map task outputs and write the Map task outputs to the storage network; and the Reduce Task Tracker 703 configured to, in response to receiving the Reduce task allocated by the Job Tracker, read the Map task outputs from the storage network.

Therein, the Map Task Tracker further comprises: a data read module configured to, in response to receiving a Map task allocated by the Job Tracker, read the input data splits of the Map task from the storage position specified by the Job Tracker; an analysis module configured to analyze key-value pairs from the input data splits; a Map function invoking module configured to invoke the Map function to perform computing on the key-value pairs and generate the outputs of the Map function; a partition module configured to partition the outputs of the Map function to form the Map task outputs; a write module configured to write the Map task outputs to the storage network and record the write position information of the Map task outputs; and a Map task notify module configured to, upon completion of the Map task, send a notification of completion of the Map task to the Job Tracker and send the write position information of the Map task outputs to the Job Tracker.

According to one embodiment of the present invention, the write module is further configured to write the Map task outputs in the form of data blocks to the storage network through the Fiber Channel Protocol (FCP). Specifically, the write module is further configured to: write the Map task outputs to the corresponding position of the logical unit on the storage device in the storage network allocated to the Map Task Tracker through the Fiber Channel Protocol (FCP); and record the write position information of the Map task outputs including Storage Device Identification WWPN, Logical Unit Number LUN, the start address offset of the data blocks in the logical unit and data block length fields.

According to another embodiment of the invention, the write module is further configured to write the Map task outputs to the storage network through a storage network file system. Specifically, the write module is further configured to: check that a storage network file system has been installed on a server deployed with the Map Task Tracker; write the Map task outputs to the storage network file system; and record the path name of the Map task outputs in the global name space of the storage network file system as the write position information of the Map task outputs.

Therein, the Reduce Task Tracker further comprises: a Map task outputs read module configured to read the Map task outputs from the corresponding write position of the storage network, in response to receiving the Reduce task allocated by the Job Tracker and the write position information of the Map task outputs.

According to one embodiment of the present invention, the Map task outputs read module is further configured to obtain the data blocks of the Map task outputs from the storage network through the Fiber Channel Protocol (FCP). Specifically, the read module is further configured to: parse the received write position information of the Map task outputs to obtain Storage Device Identification WWPN, Logical Unit Number LUN, start address offset of the data block in the logical unit and data block length fields; and read the Map task outputs from corresponding position of the logical unit on the storage device in the storage network identified by the Storage Device Identification WWPN, Logical Unit Number LUN, start address offset of the data blocks in the logical unit and data block length fields.

According to one embodiment of the present invention, the Map task output read module is further configured to obtain the Map task outputs through the storage network file system. Specifically, the read module is further configured to: check that the storage network file system has been installed on the server deployed with the Reduce Task Tracker; parse the received write position information of the Map task outputs to obtain the path name of the Map task outputs in the global name space of the storage network file system; convert the path name into a path name in the local file system of the local server deployed with the Reduce Task Tracker; and obtain the Map task outputs by accessing the path name in the local file system.

It should be understood that at least some aspects of the present invention may be implemented by a program product alternatively. A program defining functions related to the present invention may be transferred to a data storage system or a computer system by various signal bearing media, including but not limited to un-writable storage medium (e.g., CD-ROM), writable storage medium (e.g., floppy disk, hard disk drive, read/write CD ROM, optical medium), and communications media such as computer and telephone networks including Ethernet and the like. Therefore, it should be understood that the kinds of signal bearing media carried or encoded with the computer-readable instructions for managing method functions of the present invention represents an alternative embodiment of the present invention. The invention can be implemented by hardware, software, firmware, or a combination thereof. The invention can be implemented in one computer system centrally, or in a distributed way where different components are distributed in several interconnected computer systems. Any computer system or other means applicable for performing the method described in the description are suitable. Preferably, the present invention is implemented in a combination of computer software and general computer hardware, in which when being loaded and executed, the computer program controls the computer system is to perform the method of the present invention, or to constitute the system of the present invention.

The above description of preferred embodiments of the invention is given for the purpose of example. The above description of preferred embodiments is neither exhaustive nor intended to limit the invention to the disclosed explicit form, and apparently in light of the above teachings, many modifications and changes are possible. It is obvious to those skilled in the art that the modifications and changes are included within the scope of the present invention defined by the appending claims.

The invention claimed is:

1. A method for transmission of map/reduce data in a data center having a storage area network, the data center including multiple servers deployed with a job tracker, at least one map task tracker, and at least one reduce task tracker, the method comprising:
   in response to receiving a map task allocated by the job tracker, the at least one map task tracker performing the map task and generating map task outputs;
   the at least one map task tracker writing the map task outputs to the storage area network, by transmitting the map task outputs to the storage area network via a fiber channel protocol, the at least one map task tracker does not communicate with the storage area network via a local area network, the at least one map task tracker writing the map task outputs to the storage area network further comprises;
   recording write position information of the map task outputs; and
   upon completion of the map task, sending a notification of completion of the map task to the job tracker and sending the write position information of the map task outputs to the job tracker; and
   in response to receiving a reduce task allocated by the job tracker and the write position information of the map task outputs provided from the job tracker, the at least one reduce task tracker reading the map task outputs, based on the write position information, from the storage area network by receiving the map task outputs via the fiber channel protocol, the at least one reduce task tracker does not communicate with the storage area network via the local area network.

2. The method according to claim 1, wherein the at least one map task tracker writing the map task outputs to the storage area network further comprises:
   writing the map task outputs in a form of data blocks to a corresponding position of a logical unit allocated to the at least one map task tracker via the fiber channel protocol, wherein the logical unit is on the storage area network, and
   wherein the write position information of the map task outputs at least comprises Storage Device Identification WWPN, Logical Unit Number LUM, start address offset of the data blocks in the logical unit and data block length fields.

3. The method according to claim 2, wherein, in response to receiving a reduce task allocated by the job tracker, the at least one reduce task tracker reading the map task outputs further comprises:
   parsing the received write position information of the map task outputs to obtain Storage Device Identification WWPN, Logical Unit Number LUN, start address offset of the data blocks in the logical unit and data block length fields; and
   reading the map task outputs from the corresponding position of the logical unit on the storage device in the storage area network identified by the Storage Device Identification WWPN, Logical Unit Number LUM, start address offset of the data blocks in the logical unit and data block length fields.

4. The method according to claim 1, wherein, the at least one map task tracker writing the map task outputs to the storage area network further comprises:
   writing the map task outputs to the storage area network through a storage network file system.

5. The method according to claim 4, wherein, writing the map task outputs to the storage area network through a storage network file system further comprises:
   determining that the storage network file system has been installed on a server of the multiple servers deployed with the at least one map task tracker; and
   writing the map task outputs to the storage network file system.

6. The method according to claim 5, wherein, recording write position information of the map task outputs further comprises:
   recording a path name of the map task outputs in a global name space of the storage network file system as the write position information of the map task outputs.

7. The method according to claim 6, wherein, in response to receiving the reduce task allocated by the job tracker, the at least one reduce task tracker reading the map task outputs further comprises:

determining that the storage network file system has been installed on a server of the multiple servers deployed with the at least one reduce task tracker;

resolving the received write position information of the map task outputs to obtain the path name of the map task outputs in the global name space of the storage network file system;

converting the path name to a path name in the local file system of the server deployed with the at least one reduce task tracker; and obtaining the map task outputs by accessing the path name in the local file systems.

8. The method according to claim 1, wherein the generating of the map task outputs comprises: reading input data splits of the map task from a storage position specified by the job tracker;

analyzing key-value pairs from the input data splits;

invoking a map function to perform computing on the key-value pairs and generating outputs of the map function; and partitioning the outputs of the map function to form the map task outputs, wherein the partitioning the outputs of the map function to form the map task outputs comprises: generating partitioning results by a partition function, and writing the partitioning results to R regions of the local file system.

* * * * *